E. FOWLER.
COTTON AND CORN SCRAPER.
APPLICATION FILED APR. 21, 1910.

1,054,403.

Patented Feb. 25, 1913.

WITNESSES

INVENTOR
Edward Fowler
By Knight Bros.
his Attorney

UNITED STATES PATENT OFFICE.

EDWARD FOWLER, OF CEDAR GROVE, GEORGIA.

COTTON AND CORN SCRAPER.

1,054,403.

Specification of Letters Patent.

Patented Feb. 25, 1913.

Application filed April 21, 1910. Serial No. 556,675.

*To all whom it may concern:*

Be it known that I, EDWARD FOWLER, a citizen of the United States, and resident of Cedar Grove, in the county of Walker and State of Georgia, have invented certain new and useful Improvements in Cotton and Corn Scrapers, of which the following is a specification.

This invention relates to an improvement in cotton scrapers and has for its primary object to provide an implement, which may be used with equal efficiency in the cultivation of cotton, corn or other plants of like character.

Another object of the present invention is to provide the lower scraper knives with superposed top knives or blades, which are adjustable relative to said knives so that the space between the top and lower knives may be regulated according to the character of the plants under cultivation. These top blades tend to ward off or push back the heavy sods which are separated from the soil adjacent to the plants by the lower scraper knives but permit the fine soil to sift between the upper and lower knives so as to bank around and support the plants.

Figure 1:
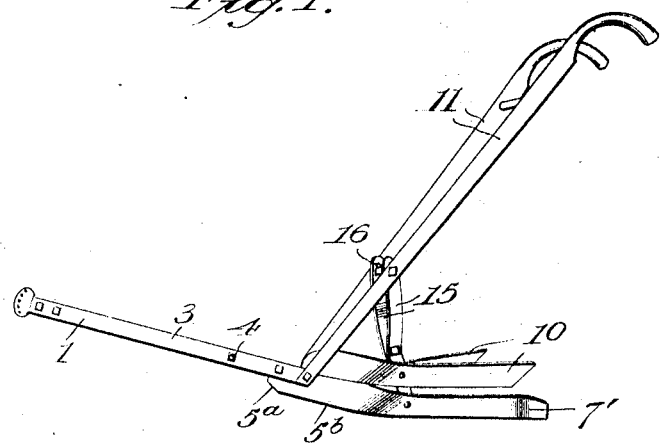
Figure 2:
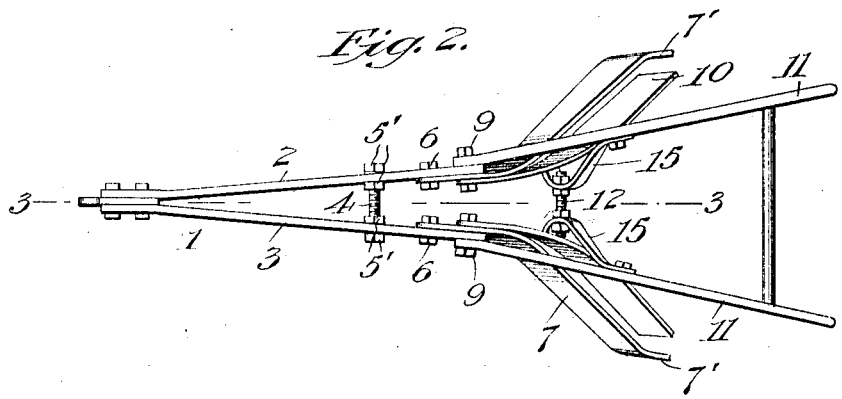
Figure 3:
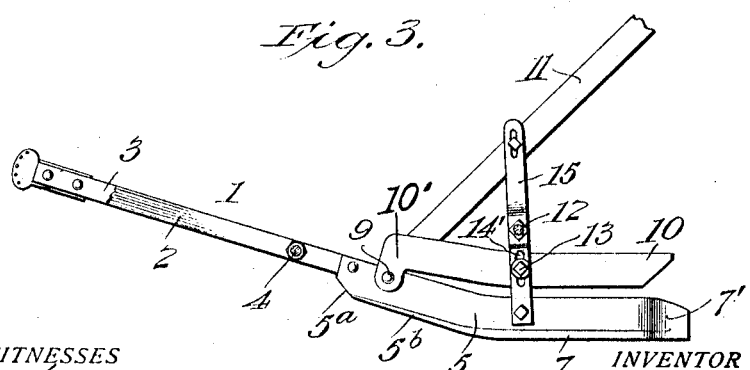

Further objects and advantages will appear from the following description with reference to the accompanying drawing, wherein, Figure 1 is a perspective view of a scraping implement embodying my invention; Fig. 2 is a top plan view thereof; and Fig. 3 is a longitudinal section on the line 3—3 of Fig. 2.

Referring more particularly to the drawing, wherein like reference characters indicate like parts throughout the different views, 1 indicates a beam comprising a pair of bars 2 and 3 respectively secured together at their front extremities in any suitable manner. These bars are inclined from their rear extremities toward the front and diverge as they extend rearwardly and are connected by means of the adjusting bolt or rod 4, which is threaded throughout its length and adapted to receive the nuts 5', which are located on each side of each of the bars 2 and 3. It will be seen that by operating these nuts, the bars 2 and 3 may be drawn together or forced apart to either decrease or increase the space therebetween.

Secured to the rear end of each of the bars 2 and 3 are the lower scraper knives 5, which are held rigidly to said bars by fastening means 6. These scraper knives are provided with a sharpened lower edge and are flanged or bent outwardly intermediate their front and rear ends as at 7, this portion of the knives or blades being inclined upwardly from the sharpened edge. It will be seen that the intermediate portion 7 of the blades diverge as they extend rearwardly, the extreme rear ends 7', however, being bent so that they lie substantially parallel to each other. The blades 5, adjacent to their front ends are slightly elevated, as at 5$^b$ so as to assure a clean draw cut through the soil, while the extreme front end of each knife is beveled upwardly from the cutting edge as at 5$^a$.

10 are upper blades or knives positioned above and in substantially vertical alinement with the lower blades. These upper blades are pivotally secured to the extreme rear ends of the bars 2 and 3 by means of bolts 9, which pass through the downwardly extending flanged ends 10'. In order to render these upper blades adjustable relatively to the cutting knives 5, suitable brackets 15 are secured respectively to the handles 11 and the scrapers or cutting blades 5. These brackets converge intermediate their ends and are connected by means of the adjusting rod or bolt 12. The upper blades are secured to these brackets by bolts 13, which pass through vertical slots 14' formed in the brackets. By this arrangement, it will be seen that upon loosening the bolts 13, the upper blades may be raised or lowered relatively to the cutting knives 5, and secured in their adjusted positions by tightening the bolts or nuts 13. These brackets are secured at their upper ends to the handles 11, as has been heretofore stated, by bolts, which pass through vertical slots 16 formed in the brackets. Under certain conditions, it may be desirable to raise or lower the handles relative to the blades or knives, this adjustment being made possible by means of the slot connection between the brackets and the handles.

From the above description, it will be seen that when plants of different degrees of growth are under cultivation, the space between the opposite knives may be regulated by operation of the bolt or rod 12, together with the operation of the rod 4, whereby the space between the cutters 5 will be either increased or decreased as desired.

By arranging the different elements as above described it will be understood that the scraper blades 5 are at all times held rigidly relative to the frame or beam 1, by means of the bolts 6 and 9, each of which passes through said blades, while the fenders 10 and handles 11 are capable of adjustment relative to the fixed scraper blades 5, having as a pivot point the bolt 9. Of course, when the implement is in operation, these members are each held relatively rigid by tightening the different bolts and nuts. As has been stated heretofore, the scraper blades 5 have their front and rear extremities bent so as to lie approximately parallel to the line of draft, whereby said portions will form guides for the entire blade to permit the same to act substantially as landsides.

I claim:—

1. In a device of the class described, the combination with a frame, having handles secured thereto, of a pair of oppositely disposed diverging lower scraper blades secured to said frame, a pair of top blades arranged in superposed relation to said lower blades and a pair of adjustably connected brackets rigidly secured to the lower scraper blades, each of said brackets provided with vertical slots, and means passing through said slots to adjustably secure the handles and top blades thereto.

2. In a cotton scraper, a pair of scraper blades diverging rearwardly, having their front and rear ends bent approximately parallel to the line of draft, thereby forming guide elements.

3. A cotton scraper, comprising a beam, handles movably secured thereto, a pair of lower cutting blades, rigidly connected to the beam, top blades movably attached to the beam, and arranged in substantially vertical alinement with the lower cutting blades, a pair of brackets, each rigidly fastened at their lower end to the lower scraper blades, and having adjustable connection with the top blades and handles, whereby the top blades may be adjusted relative to the handles and lower cutting blades.

4. In a device of the class described, the combination with a frame, handles secured thereto, of a pair of oppositely disposed scraper blades carried by said frame, a pair of curved brackets, converging intermediate their opposite ends, adjusting means connecting the said brackets, whereby the space therebetween may be regulated, and means connecting the extreme ends of said brackets to the handles and scraper blades respectively, whereby the handles may be vertically adjusted relative to the scraper blades.

5. In a cotton scraper, a pair of lower scraper blades diverging rearwardly and having their front ends spaced apart, and a pair of top scraper blades arranged in superposed relation to said lower blades.

6. In a cotton scraper, a pair of lower scraper blades having their front ends spaced apart, a pair of top blades adjustably arranged in superposed relation to said lower blades.

7. In a cotton scraper, a pair of lower and upper scraper blades diverging rearwardly and having cutting edges longitudinally disposed, the front portion thereof being spaced apart and inclined upwardly.

8. In a cotton scraper, a pair of lower and upper scraper blades diverging rearwardly and longitudinally disposed, the front ends of the blades being bent approximately parallel to the line of draft, said front ends constituting guide elements.

The foregoing specification signed at Cedar Grove Ga. this 22 day of March, 1910.

EDWARD FOWLER.

In presence of two witnesses:
R. B. CAMP,
BYRON V. KELL.